United States Patent

[11] 3,543,968

[72] Inventors Alan B. Reighard;
Samuel R. Rosen, Bay Village; Robert G. Baker, Lorain, Ohio
[21] Appl. No. 808,727
[22] Filed March 20, 1969
[45] Patented Dec. 1, 1970
[73] Assignee Nordson Corporation
Amherst, Ohio
a corporation of Ohio

[54] GUN FOR DISPENSING THERMOPLASTIC MATERIALS
11 Claims, 6 Drawing Figs.
[52] U.S. Cl. ................................................ 222/146, 219/229
[51] Int. Cl. .................................................. F16k 31/62
[50] Field of Search............................................ 222/146, 504; 219/303, 304, 233, 227, 229, 306

[56] References Cited
UNITED STATES PATENTS
3,337,093 8/1967 Newton........................ 222/146
3,485,417 12/1969 Cocks........................... 222/146

Primary Examiner—George T. Hall
Attorney—Bosworth, Sessions, Herrstrom & Cain

ABSTRACT: A gun for dispensing thermoplastic or viscous materials, particularly molten adhesives. Molten thermoplastic material is introduced under pressure to a conduit in the grip of the gun and flows from there through a conduit in the gun barrel to a trigger controlled outlet nozzle. The conduits in the barrel and in the handle are provided with thermostatically controlled heaters to melt or to maintain molten the thermoplastic material. The heated interior portion of the grip is spaced from the exterior gripping portion by insulation or by insulation and an air space. When an air space is provided cooling air is drawn into the rear of the gun by a fan or is introduced thereto through a line from a suitable pressurized supply, and circulates in and through the air space to maintain the temperature at the exterior of the grip at a comfortable level.

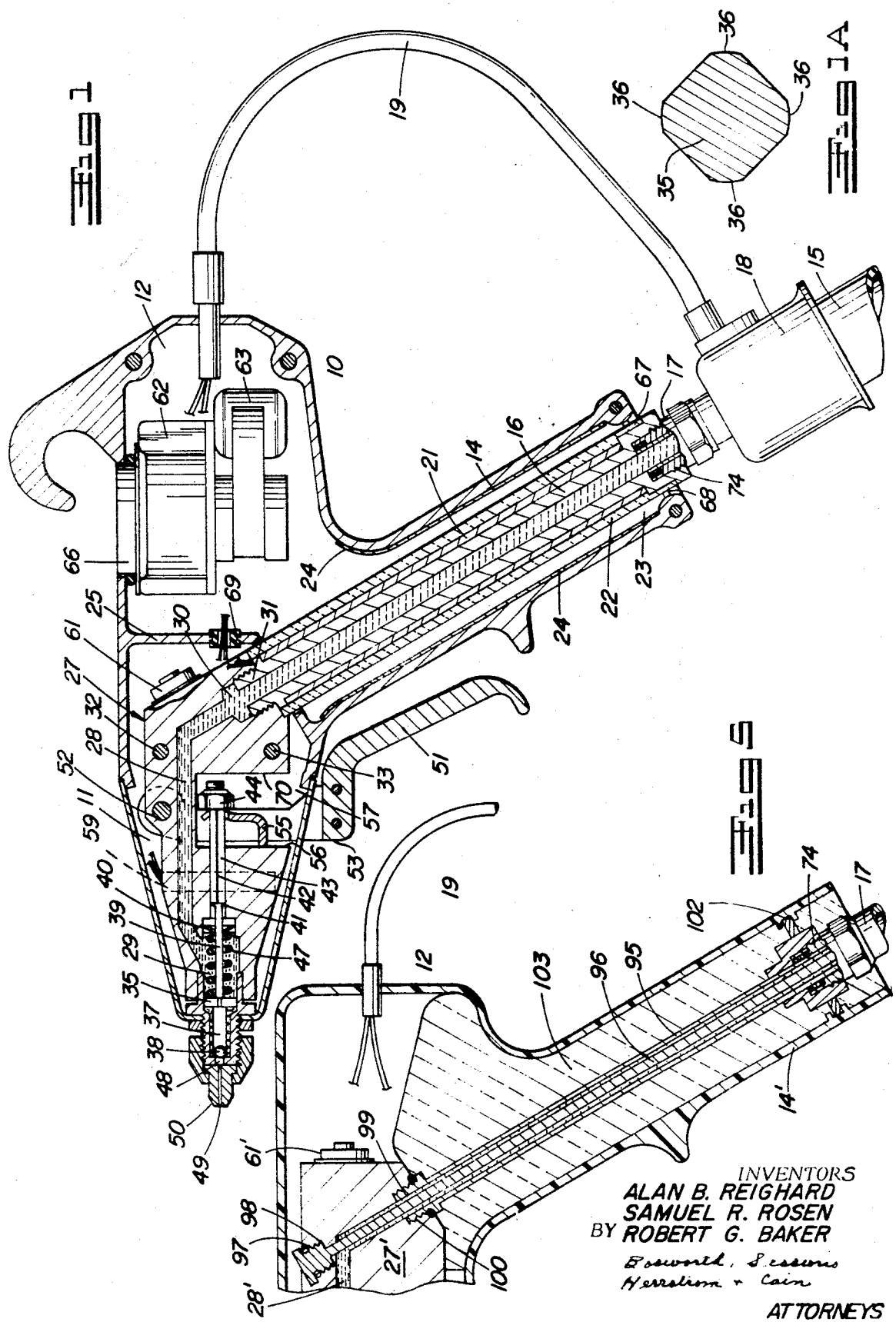

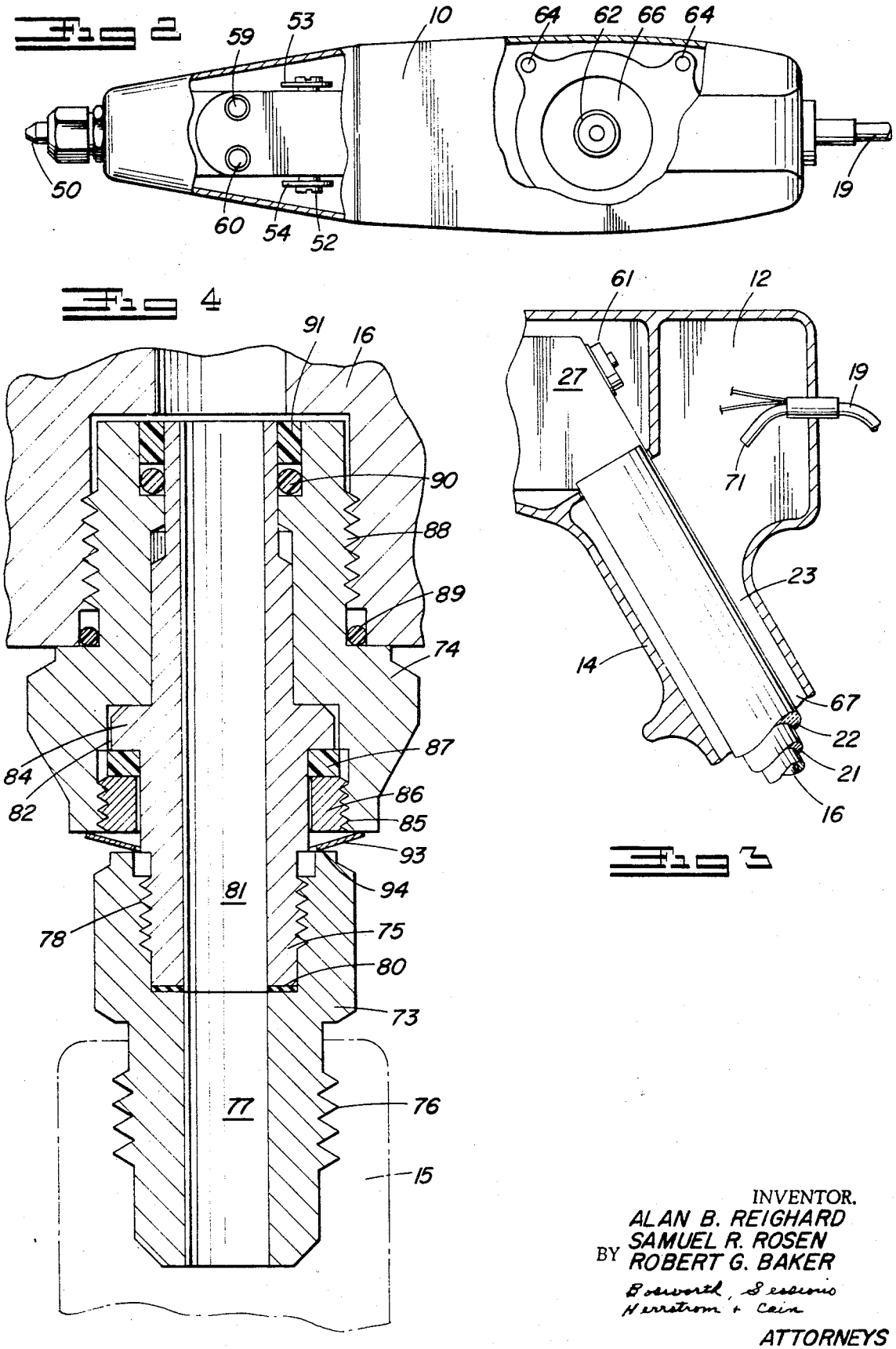

GUN FOR DISPENSING THERMOPLASTIC MATERIALS

BACKGROUND OF THE INVENTION

This invention relates to the dispensing of thermoplastic or viscous materials and especially to manually controlled guns for applying such materials to relatively inaccessible locations. More particularly, the invention relates to such guns in which the thermoplastic material enters the gun in molten form and flows through passages that are heated to maintain the material in it's molten state or to melt it after it is allowed to solidify.

Thermoplastic adhesives have many applications in the bonding art, a principal application being in the gluing of the various edges and surfaces necessary to construct a piece of furniture. Bonding of these joints and surfaces does not lend itself to automatic or production line methods. The gluing must ordinarily be done by hand at one location because the joints and surfaces to be glued are often inaccessible. An adhesive dispensing element in the form of a gun is very advantageous since it can be efficiently manipulated by a skilled workman who must move around the workpiece rather than moving the workpiece itself.

Prior art guns for dispensing thermoplastic adhesives have generally been of the type in which the material is introduced into the gun in solid rodlike form and is melted in the barrel. Considerable difficulty has been encountered with heating the solid material in advance of the melting area resulting in softening of the material and its adhesion to the walls of the passage. A more serious problem encountered when using such guns is "overcooking" of the adhesive which cause a substantial decrease in its bonding effectiveness. "Overcooking" occurs in such guns because the solid adhesive rod must be melted very rapidly and continuously as molten adhesive is dispensed which necessitates the use of a large amount of heat to produce rapid melting. A relatively short delay in dispensing the molten material, which can easily occur in, for example, bonding furniture joints, causes the adhesive within the gun to be "overcooked".

A principal hindrance in the use of dispensing guns in which liquid material is introduced to the gun is the supply line that must be connected to the gun. The location of the coupling between the supply line and the gun is particularly important when the gun must be used in cramped spaces which is ordinarily the case in dispensing adhesive to the relatively inaccessible areas that must be bonded in constructing a piece of furniture.

The least disadvantageous location for the hose to be coupled to the gun has in most cases been found to be at the base of the grip. However, this location presents a problem when dispensing molten adhesives since the adhesive enters the gun at an elevated temperature and must be maintained in a molten state in the gun, preferably at an optimum temperature.

SUMMARY OF THE INVENTION

A general object of this invention is to provide a gun for heating and dispensing thermoplastic or highly viscous materials that solves the problems discussed above. More particular objects are to provide such a gun into which molten material is introduced through a supply hose coupled to the base of the grip for maximum maneuverability and that includes means within the gun for melting the thermoplastic material or maintaining it molten.

Another object is to provide a gun for heating and dispensing thermoplastic or highly viscous materials that is especially advantageous for applying molten adhesive to inaccessible locations such as furniture joints.

Still another object of this invention is to provide in a gun for heating and dispensing thermoplastic or highly viscous materials a grip having a central conduit that is heated to maintain the material molten while the exterior of the grip is maintained at a comfortable temperature level.

A preferred form and embodiment of our gun comprises a barrel, a grip, and a conduit within the grip and barrel having an inlet at the lower end of the grip for the molten material and an outlet at the forward end of the barrel. A valve in the conduit is actuated by a trigger to control the flow of the molten material. A heater in the grip heats the material in the conduit within the grip and means are provided to control the temperature of the material to maintain it in the molten state and at a temperature at which deterioration proceeds slowly. Means are also provided for preventing the temperature of the external surface of the grip from rising to a level that would be painful to a human hand holding the grip.

BRIEF DESCRIPTION OF THE DRAWINGS

FIG. 1 is a vertical sectional view of a gun according to our invention that is preferred for dispensing higher temperature molten materials.

FIG. 1a is a vertical sectional view of the diamond shaped washer of the valve assembly employed in our guns.

FIG. 2 is a top view partially cut away of the gun in FIG. 1.

FIG. 3 is a side elevation with the frame cut away of the grip and rearward barrel portions of a gun essentially the same as that in FIGS. 1 and 2 but employing different cooling means for the grip.

FIG. 4 is a longitudinal sectional view of the swivel connection that connects the gun to the supply hose.

FIG. 5 is a vertical sectional view of the grip and rearward barrel portion of a gun that is preferred for dispensing lower temperature molten materials.

DESCRIPTION OF THE PREFERRED EMBODIMENTS

A form of our invention that is preferred for dispensing higher temperature thermoplastic materials is illustrated particularly in FIGS. 1 and 2 and comprises there a gun having a frame 10 of plastic or other suitable non-heat-conducting material including a forward barrel portion 11, a rearward barrel portion 12 and a grip 14. Molten thermoplastic material is supplied to the gun through a heated hose 15 coupled to the base of a conduit 16 in the grip of the gun through a swivel connection 17 as will be described more fully hereinafter. Hose 15 is provided with a cuff 18 through which the swivel connection 17 extends and from one side of which extends an electrical cable 19 that is connected to the rearward barrel portion 12 of the gun. The wires that form electrical cable 19 are routed with supply hose 15. The construction of hose 15 and the apparatus by which it is heated form no part of this invention and are not disclosed in detail.

Disposed longitudinally within grip 14 is the conduit 16 through which molten thermoplastic material flows. A tubular heater 21 of the electrical resistance type surrounds conduit 16 and is in turn surrounded by suitable heat insulating material 22. The entire assembly comprising conduit 16, heater 21 and heat insulator 22 is spaced from the inner walls of grip 14 thereby defining an air space 23. The inner walls of grip 14 are provided with a thin layer 24 of, for example, chrome or other suitable metal which serves to reflect any heat that may be radiated through air space 23.

Rearward barrel portion 12 and grip 14 are separated from forward barrel portion 11 by a wall 25 through which the assembly of conduit 16, heater 21 and insulator 22 extends into forward barrel portion 11. Within forward barrel portion 11 is an aluminum casting 27 having a passage 28 that communicates with the passage defined by conduit 16 and through which the molten thermoplastic material flows to a reservoir 29. The rearward end of passage 28 terminates in an enlarged portion 30 interiorly threaded to receive upper threaded portion 31 of conduit 16. Casting 27 is supported within forward barrel portion 11 by screws 32 and 33 that anchor casting 27 to frame 10.

Disposed within the reservoir 29 is a valve assembly comprising a diamond shaped washer 35 (FIG. 1a) having side portions 36 of the proper curvature to have a sliding fit with the inner walls of reservoir 29, a forward rod portion 37 welded or otherwise suitably joined to the forward face of washer 35 and terminating in a hemispherical valve 38, and a rearwardly extending rod portion 39 jointed to the rearward face of washer 35. The rearward portion of the rod 39 has a close sliding fit with a seal 40 which preferably comprises a teflon washer that has been punctured by the rod 39 so that the displaced material closely surrounds and clings to the circumference of the rod thereby providing a very effective seal. The rearward end of rod 39 is provided with a head 41 to which is attached a thin wire 42. Head 41 of rod 39 is of the proper circumference to slide freely but accurately within a cylindrical guideway 43. Guideway 43 is externally threaded at its rearward end to accommodate an adjusting nut 44 to which the rearward end of wire 42 is connected.

A spring 47 fits within reservoir 29 with its rearward end resiliently contacting the front face of seal 40 and its forward end resiliently contacting the rearward face of the diamond shaped washer 35. Spring 47 biases the hemispherical valve 38 into sealing engagement with the rearward end of a passage 48 that communicates with a discharge opening 49 in a nozzle 50.

A trigger 57 is pivotally secured to casting 27 by a pin 52 extending through trigger flange portions 53 and 54 on opposite sides of casting 27. Connected to flange portions 53, 54 is a stop member 55 that contacts at its rearward portion adjusting nut 44 and at its forward portion a surface 56 in a cut out portion 57 of casting 27. Two cartridge heaters 59 and 60 (FIGS. 1 and 2) of the electrical resistance type are embedded in casting 27 on opposite sides of passage 28 to heat casting 27 and melt or maintain molten the material in passage 28. A thermostat 61 provides temperature control for casting 27 and conduit 16.

Within rearward barrel portion 12 is a fan 62 driven by an electric motor 63. Fan 62 and motor 63 are supported by screws 64 that connect fan 62 to frame 10. A portion of the frame 10 is cut out as at 66 immediately above fan 62 to provide an inlet for cooling air. The air is drawn into rearward barrel portion 12, circulates in air space 23 to cool the walls of handle 14, and exits through an annular opening 67 at the base of handle 14. A spacer 68 in opening 67 supports the conduit and heater assembly and permits circulation of air. Electrical power for the motor 63, and for the heaters 21, 59 and 60 is supplied through cable 19 which is routed with supply hose 15 and extends through cuff 18 at the top of hose 15. From rearward barrel portion 12 the conductors of cable 19 are routed through a grommet 69 in wall 25 to thermostat 61 and to heaters 21, 59 and 60.

In operation, the molten thermoplastic material, for example, molten adhesive, is supplied through heated hose 15 to conduit 16 at a pressure of from 100 p.s.i. to 1500 p.s.i., preferably about 200 p.s.i. The molten material flows from conduit 16 through passage 28 in casting 27 to reservoir 29, around washer 35 and forward rod portion 37 and is prevented from entering passage 48 by the hemispherical valve 38.

Thermoplastic adhesives have no precise melting point temperature but rather melting is a function of time and temperature. "Overcooking" of the material is also a function of both time and temperature. However, there are temperatures at which the materials are completely molten and at which "overcooking" proceeds so slowly compared to the rate at which material is dispensed as to be almost negligible. These temperatures are relatively easy to attain in a system that is maintained substantially in thermal equilibrium, that is, without intentional rapid heating to, for example, melt solid material rapidly.

Thermoplastic adhesives now commonly used such as ethylene vinyl acetate and polyethylene modified wax are maintained molten and are dispensed at temperatures ranging from 200° F. to 450° F., preferably about 350° F. Other thermoplastic adhesives are maintained molten and are dispensed at temperatures of from 450° F. to 600° F. preferably about 500° F. to 550° F. The latter adhesives are not now as widely used as the former but their use is increasing. Examples of the latter adhesives are polyamides and polyesters. Ideally then, molten adhesive of the higher temperature type enters the lower end of conduit 16 at a temperature of about 550° F. Thermostat 61 maintains the temperature of casting 27 and conduit 16 at approximately 550° F. The thermoplastic material is thus maintained molten and at an optimum temperature for dispensing without being "overcooked" by maintaining the material in a state of substantial thermal equilibrium.

Cooling air is drawn into rearward barrel portion 12 through inlet 66 by fan 62, circulates through air space 23 to cool handle 14 and exhausts through annular space 67. The volume of air flow is preferably at least 0.8 cubic feet per minute. Reflective layer 24 on the interior of grip 14 also assists in maintaining the exterior of grip 14 at a comfortable temperature by reflecting heat radiated to it from heater 21.

Thermoplastic material is dispensed by squeezing trigger 51 which causes flange portions 53 and 54 to pivot about pin 52 and force adjusting nut 44 rearwards thereby pulling washer 35 rearward against the pressure of spring 47 and pulling hemispherical valve 38 from its sealing engagement with the entrance to passage 48. The molten material then flows from the forward portion of reservoir 29 through passage 48 and emerges from passage 49 in nozzle 50 as a thin liquid stream. The amount of retraction of the valve 38 may be varied by positioning adjusting nut 44 forwardly or rearwardly along guideway 43 to control the amount of rearward movement possible before adjusting nut 43 abuts the inner face 70 of the cutout portion 57 of casting 27.

The gun may be laid aside for relatively short periods of time and will be instantly ready for use when dispensing of thermoplastic adhesive is again required. Overnight the molten material may be allowed to solidify within the gun when power is disconnected from heaters 21, 59 and 60. The next morning power is again connected to heaters 21, 59 and 60, and within a short time the material will melt and thermal equilibrium will be established so that use of the dispensing gun may be resumed.

In FIG. 3 there is shown an alternate means of supplying cooling air to the grip 14 of our dispensing gun. In the gun of FIG. 3 the rearward barrel portion has been considerably reduced in size since it is not necessary to accommodate the cooling fan 62 shown in FIG. 1. Instead of the fan 62 an air line 71 is routed from a suitable source of air under pressure along with heated hose 15 and is carried by cable 19 into the rearward barrel portion of the gun. Air under pressure from the line 71 circulates through air space 28 and emerges from annular space 67 at the base of the grip 14 to cool the grip in the same manner as did air drawn into the rearward barrel portion of the gun by the fan 62.

An important feature adding to the versatility of our dispensing gun is the swivel connection 17 illustrated in greater detail in FIG. 4. The swivel connection allows the gun to swivel with respect to the hose 15 thereby increasing the ability of the operator to maneuver the gun into inaccessible locations and decreasing the possibility of twisting or tearing the heated hose 15.

Referring now to FIG. 4 the swivel connection comprises three basic members, a hose fitting member 73, a gun fitting member 74 and an intermediate connecting member 75. Hose fitting member 73 is exteriorly threaded as at 76 to engage an interiorly threaded metallic end portion of hose 15 and has an interior bore 77 through which the thermoplastic material flows. Hose fitting member 73 is provided at its opposite end with interior threads 78 which engage an exterior threaded portion of intermediate member 75 for joining the members. A seal 80 of suitable heat resistant material such as teflon is provided at the interface between the two members. Intermediate member 75 has a central bore 81 that communicates at one end with the bore 77 of hose fitting member 73 and at the other end with the bore of conduit 16 in grip 14 of the gun.

Gun fitting member 74 concentrically surrounds the upper portion of intermediate member 75 and has an enlarged annular opening 82 to accommodate a radially extending shoulder 84 of intermediate member 75. Gun fitting member 74 is rotatably connected to intermediate member 75 by an interiorly threaded portion 85 that engages an exteriorly threaded ring 86 which rotatably encircles intermediate member 75 below shoulder 84. A teflon thrust bearing 87 encircles intermediate member 75 between shoulder 84 and ring 86. The upper portion of gun fitting member 74 is adapted to be connected to conduit 16 and for that purpose is exteriorly threaded as at 88. A teflon O-ring 89 provides a seal between conduit 16 and gun fitting member 74 and a similar O-ring 90 provides a seal between intermediate member 75 and gun fitting member 74. A teflon thrust bearing 91 is disposed between intermediate member 75 and gun fitting member 74 adjacent O-ring 90 to facilitate rotation of gun fitting member 74 about intermediate member 75.

A conical spring washer 93 encircling intermediate member 75 is supported at its inner diameter by an upwardly extending flange 94 of hose fitting member 75 and at its outer diameter contacts the lowermost surface of gun fitting member 74. Spring washer 93 comprises a safety electrical ground connection from hose fitting member 73 to gun fitting member 74 across the swivel connection by acting essentially as a slip ring to maintain continuous contact between members 73 and 74 as member 74 swivels with respect to intermediate member 75. The spring washer is flexible in an axial direction and is proportioned to maintain good electrical contact between member 73 and member 74 when member 74 is snugly threaded onto ring 86.

In operation, gun fitting member 74 is nonrotatably coupled to conduit 16 and is free to rotate with the gun about intermediate member 75, hose fitting member 73 and hose 15 which are nonrotatably coupled. Intermediate member 75 is supported by thrust bearing 87 that seats on ring 86. Ring 86 is free to rotate with gun fitting member 74 about intermediate member 75. Spring washer 93 insures that a reliable safety electrical ground will be provided to gun fitting member 74 and thereby to the inner metallic portions of the gun.

The compactness of the swivel connection and the arrangement of its members provide good thermal conductivity across the connection thereby minimizing heat loss across the connection.

Referring for a moment to FIG. 1 it will be seen that we have overcome the difficulty of supplying electrical power across the swivel connection by routing the electrical cable 19 from the end of the hose 15 through the cuff 18 and into the rearward barrel portion 12 of the gun bypassing the swivel connection.

Referring now to FIG. 5 there is shown another form of our dispensing gun in which a heater is disposed within the conduit 95 instead of being external to it and in which the exterior of the grip 14 is maintained at a comfortable temperature by insulation between the conduit 95 and the inner walls of the grip instead of by cooling air. The parts of the forward barrel portion including the casting and the valve retracting mechanism are essentially the same as those disclosed in FIG. 1. Accordingly, the forward barrel portion is not shown. Also, since no cooling means are provided in the rearward barrel portion, that portion is reduced to a size substantially the same as that in the gun of FIG. 3. The swivel connection used with this gun is identical to that disclosed in FIG. 4.

In FIG. 5 there is shown a portion of a gun including a grip 14' in which there is centrally disposed a conduit 95 through which the molten material flows. Centered within the conduit 95 is an electrical resistance heater 96 which heats the molten material. Heater 96 has an upper exteriorly threaded portion 97 which engages an interiorly threaded socket 98 in casting 27'. The socket 98 communicates with and extends generally upwardly from passage 28' in casting 27'.

Conduit 95 has an upper exteriorly threaded portion 99 that engages an interiorly threaded socket portion 100 in the lower part of casting 27'. Socket portion 100 communicates with and extends downwardly from passage 28' in casting 27'. The lower end of conduit 95 is threadedly connected to gun fitting member 74 of the swivel connection as described above in connection with FIG. 4. A spacer 102 centers and supports the lower part of conduit 95. As in the previously disclosed form of the invention a thermostat 61' monitors and controls the temperature of the casting 27' and the conduit 95 by controlling the heaters 59 and 60 (FIG. 1) and heater 96.

Surrounding conduit 95 in grip 14' is a molded member 103 of silicone foam that provides insulation and grading of the temperature from the walls of conduit 95 to the inner walls of grip 14'. Silicone foam is well known and is manufactured by Dow Corning Corporation among others.

The thermal conductivity of the silicone foam varies somewhat depending upon the manufacturing process employed, but a generally reliable figure for conductivity is $0.03 \frac{\text{B.t.u.}}{\text{Hr.-Ft.}^2\text{-}°\text{F.}}$ per foot of silicone foam where BTU is British thermal units, Hr is hours, $Ft^2$ is the cross-sectional area of the foam in square feet, and °F. is the temperature difference in degrees Fahrenheit across the insulation.

The grip heating and insulating arrangement shown in FIG. 5 is preferred for use with lower temperature thermoplastic adhesives where the temperature at the outer wall of conduit 95 need not and does not exceed 450° F. Having the heater 96 centrally disposed within the conduit 95 is advantageous in that the temperature is graded or dropped through the molten material within the conduit 95 as well as through the insulating material 103. The centrally disposed heater 96 is disadvantageous, however, in that the temperature of the molten material in the conduit 95 can be controlled with much less precision while still avoiding "overcooking" of the molten material. This is so because the temperature of the material must, practically, be sensed and controlled at the outer wall of the conduit 95 and maintenance of the temperature at that point at a high level by controlled the heater 96 may cause "overcooking" of the molten material immediately adjacent the heater.

The problem just stated may be minimized by employing a conduit of relatively small diameter compared to that of the heater 96. The thickness of molten material across which the temperature can be dropped is thus made smaller thereby reducing the danger of having too large a thermal gradient across the material and overcooking the material at the central portion of the conduit. For that reason the diameter of conduit 95 is preferably no more than five-eighths inch for a maximum temperature at the conduit wall of 450° F.

In order for a pistol type grip to be comfortably held and the tool of which it is a part easily manipulated, it must not be excessively bulky. In particular if the maximum external cross sectional dimension of the grip exceeds 2 inches the grip will be too thick in that dimension to be grasped comfortably. For example, if the grip is rectangular in cross section the longest side of the rectangle should not exceed 2 inches, and if the grip is elliptical in cross section the major axis of the ellipse should not exceed 2 inches in length. When the grip is also heated internally so that it must be insulated for the protection and comfort of the person holding the grip a compromise between discomfort due to heat and discomfort due to an excessively thick grip must be effected. A temperature not exceeding 120° F. at the grip is considered not uncomfortable. In prior art guns for dispensing hot materials the compromise caused discomfort from both sources, heat and excessive thickness.

We have solved this problem compatibly with our solution to the problem of "overcooking" molten adhesive by having the heater centrally located within the conduit as shown in FIG. 5 and by filling the space between the outer walls of the conduit and the inner walls of the grip with insulation, preferably silicone foam. The conduit preferably has an internal diameter no greater than five-eighths inch and the minimum distance between the outer walls of the conduit and the inner walls of the grip is preferably no less than one-half inch. The maximum cross-sectional or thickness dimension of the grip is preferably no more than 2 inches for ease in grasping the grip.

As noted above the molten material within the conduit assists in grading the temperature and the diameter of the conduit is preferably no greater than five-eighths inch for a maximum temperature of 450° F. at the conduit walls to avoid overcooking of the material. A thickness of one-half inch of insulation can then grade the temperature to less than 120° F. at the exterior of the grip.

In place of the silicone foam insulation there may be used the combination of an inner thickness of fiberglass matting surrounded by a thickness of urethane foam. Again the thermal conductivity of these insulators varies somewhat depending upon the process of manufacture but reasonably reliable figures are $0.03 \frac{\text{B.t.u.}}{\text{Hr.-Ft.}^2\text{-}^\circ\text{F.}}$ for the fiberglass and $0.019 \frac{\text{B.t.u.}}{\text{Hr.-Ft.}^2\text{-}^\circ\text{F.}}$ for the urethane foam. The fiberglass can withstand temperatures of 1000° F. while the urethane foam can withstand temperatures of only about 285° F. A thickness of fiberglass adjacent the conduit of approximately three-fifths the radial distance between the conduit and the grip lowers the temperature at the fiberglass-urethane interface to a level that can be withstood by the urethane. Fiberglass alone could be used but the lower thermal conductivity of the urethane foam lowers the conductivity of the insulation system thereby further lowering the temperature at the exterior of the grip.

It will be apparent to those skilled in the art that we have provided a gun in several forms for dispensing thermoplastic materials in molten form that overcomes the problem of "overcooking" the molten material; that is easily maneuverable so that access can be obtained to relatively inaccessible locations; and in which the temperature of the handle is maintained at a comfortable level for the convenience of the operator. It will also be apparent that our guns may be employed for heating and dispensing viscous materials that are not thermoplastic.

While our invention has been shown and described in several forms various modifications and improvements will occur to those skilled in the art who come to understand its essential principles. We, therefore, do not wish to be limited to the specific forms of our invention herein disclosed nor in any other way inconsistent with the progress in the art which our invention has promoted.

We claim:

1. A gun for heating and dispensing molten material which tends to be substantially indispensably viscous at room temperature comprising a barrel, a grip suitable to be held in a human hand, a conduit for said material within said grip and barrel and having an inlet for said material at the lower end of said grip and terminating at the forward end of said barrel in an outlet for said material, a valve in said conduit for controlling the flow of said molten material, a trigger for actuating said valve, means for melting the material in said conduit including a heater in said grip for heating the material in said conduit within the grip, means for controlling the temperature of said material to maintain said material in a molten state and at a temperature at which deleterious thermal deterioration is inhibited, and means for preventing the temperature of the external surface of said grip from rising to a level that would be painful to a human hand holding the same.

2. The gun as claimed in claim 1 further comprising a second heater in said barrel for heating said conduit within said barrel.

3. The gun as claimed in claim 1 wherein the inner walls of said grip are provided with a metallic coating to reflect heat radiating from said heater.

4. The gun as claimed in claim 1 wherein said conduit within said grip comprises a tube spaced from the inner walls of said grip, said heater comprises a length of high resistance wire surrounding said tube covered by a layer of insulation, and said means for preventing the temperature of the external surface of said grip from rising to a level painful to the human hand comprises a fan mounted adjacent said grip operative to cause circulation of air in the space between said heater and the inner walls of said grip.

5. The gun as claimed in claim 1 wherein said conduit within said grip comprises a tube spaced from the inner walls of said grip, said heater comprises a length of high resistance wire surrounding said tube covered by a layer of insulation and said means for preventing the temperature of the external surface of said grip from rising to a level painful to the human hand comprises an air line coupled into the rear of said barrel for supplying thereto a stream of air, said air line being arranged to cause said air to circulate in the space between said heater and the inner walls of said grip.

6. The gun as claimed in claim 1 further comprising a supply hose for supplying molten material to said inlet, and means for coupling said hose to the lower end of said conduit, said coupling means being arranged to allow swiveling of said gun with respect to said supply hose.

7. The gun as claimed in claim 6 wherein said coupling means comprises a hose fitting member threadedly connected to said supply hose, an intermediate member threadedly connected to said hose fitting member, said hose fitting member and said intermediate member having alined central passages therethrough that communicate with said supply line and said inlet, and a gun fitting member fitting over said intermediate member and being supported for limited rotation about said intermediate member, said gun fitting member being threadedly connected to the lower end of said conduit, whereby said gun fitting member and said gun are free to rotate about said intermediate member with respect to said hose fitting member and said supply hose.

8. The gun as claimed in claim 7 further comprising a conical spring washer seated upon said hose fitting member having resilient flange portions extending toward said gun fitting member, said gun fitting member being adapted to resiliently engage said flange portions, whereby said hose fitting member is electrically connected to said gun fitting member continuously during rotation of said gun fitting member about said intermediate member.

9. The gun as claimed in claim 1 wherein said conduit within said grip comprises a tube spaced from the inner walls of said grip, said heater extends longitudinally through the center of said tube, and said means for preventing the temperature of the external surface of said grip from rising to a level that would be painful to a human hand comprises a filler composed of at least one insulating material surrounding said tube and filling the space between the outer walls of said tube and the inner walls of said grip.

10. The gun as claimed in claim 9 wherein said temperature controlling means maintains the temperature at the outer wall of said tube at no more than 450° F., said tube has an internal diameter no greater than five-eighths inch, and the minimum distance between the outer wall of said tube and the inner wall of said grip is no less than one-half inch.

11. The gun as claimed in claim 10 wherein the maximum thickness dimension of said grip is no greater than 2 inches.